Figure 1:
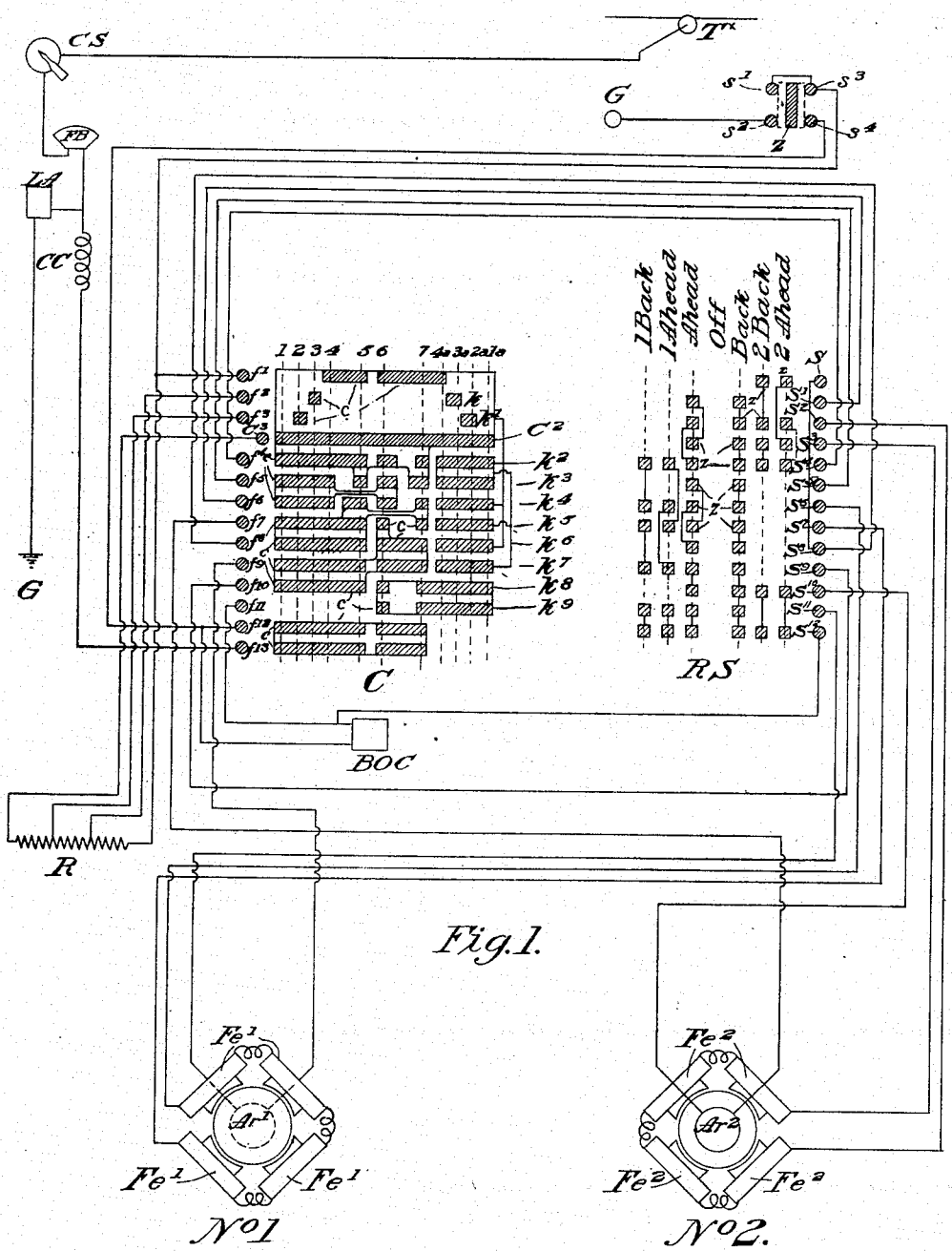

No. 677,145. Patented June 25, 1901.
E. W. STULL.
COMBINED BRAKE AND POWER CONTROLLER.
(Application filed Sept. 28, 1900.)
(No Model.) 5 Sheets—Sheet 1.

WITNESSES:
Blanche M. Smith
Cora E. Cox

INVENTOR
E. W. Stull,
BY
Geo. H. Parmelee,
his ATTORNEY.

No. 677,145. Patented June 25, 1901.
E. W. STULL.
COMBINED BRAKE AND POWER CONTROLLER.
(Application filed Sept. 28, 1900.)
(No Model.) 5 Sheets—Sheet 3.

WITNESSES:
Blanche M. Smith
Cora G. Cox

INVENTOR
E. W. Stull,
BY Geo. H. Parmelee
his ATTORNEY.

No. 677,145. Patented June 25, 1901.
E. W. STULL.
COMBINED BRAKE AND POWER CONTROLLER.
(Application filed Sept. 28, 1900.)
(No Model.) 5 Sheets—Sheet 4.

WITNESSES:
Blanche M. Smith
Cora G. Carr

INVENTOR
E. W. Stull,
BY Geo. H. Parmelee.
his ATTORNEY.

THE NORRIS PETERS CO., PHOTO-LITHO., WASHINGTON, D. C.

No. 677,145. Patented June 25, 1901.
E. W. STULL.
COMBINED BRAKE AND POWER CONTROLLER.
(Application filed Sept. 28, 1900.)
(No Model.) 5 Sheets—Sheet 5.

Positions

WITNESSES:
Blanche M. Smith.
Cora M. Cox.

INVENTOR
E. W. Stull,
BY
Geo. H. Parmelee,
his ATTORNEY.

UNITED STATES PATENT OFFICE.

EMMETT W. STULL, OF JOHNSTOWN, PENNSYLVANIA, ASSIGNOR TO THE LORAIN STEEL COMPANY, OF PENNSYLVANIA.

COMBINED BRAKE AND POWER CONTROLLER.

SPECIFICATION forming part of Letters Patent No. 677,145, dated June 25, 1901.

Application filed September 28, 1900. Serial No. 31,426. (No model.)

*To all whom it may concern:*

Be it known that I, EMMETT W. STULL, of Johnstown, in the county of Cambria and State of Pennsylvania, have invented a new and useful Improvement in a Combined Brake and Power Controller, of which the following is a full, clear, and exact description, reference being had to the accompanying drawings, which form a part of this specification.

This invention is designed to provide a combined motor-controller and electric brake in which the mechanical parts and electrical connections are very considerably simplified and reduced in number and in which the several operations of changing the motors from series to parallel, reversing the direction of the car, removing either motor from circuit, and applying an electric brake may be performed by the operation of one or the other of two handles or levers.

To this end my invention consists in providing a rotary switch of improved character which when moved in one direction from its off position will effect the regulation of the motors to govern their power and speed and when moved in the other direction will connect the motors in a closed circuit to run as generators and regulate their operation as such. In connection therewith I employ a second mechanically-independent but electrically-related switch of a type heretofore known, which can be operated to reverse the direction of rotation of the motors and also remove either motor from circuit. In connection with the first-named switch I also provide an auxiliary switch operated automatically as said first-named switch is thrown over from its power to its brake positions to effect certain circuit changes.

My invention also consists in the novel construction and combination of parts, all as hereinafter described, and pointed out in the appended claims, reference being had to the accompanying drawings, in which—

Figure 2:
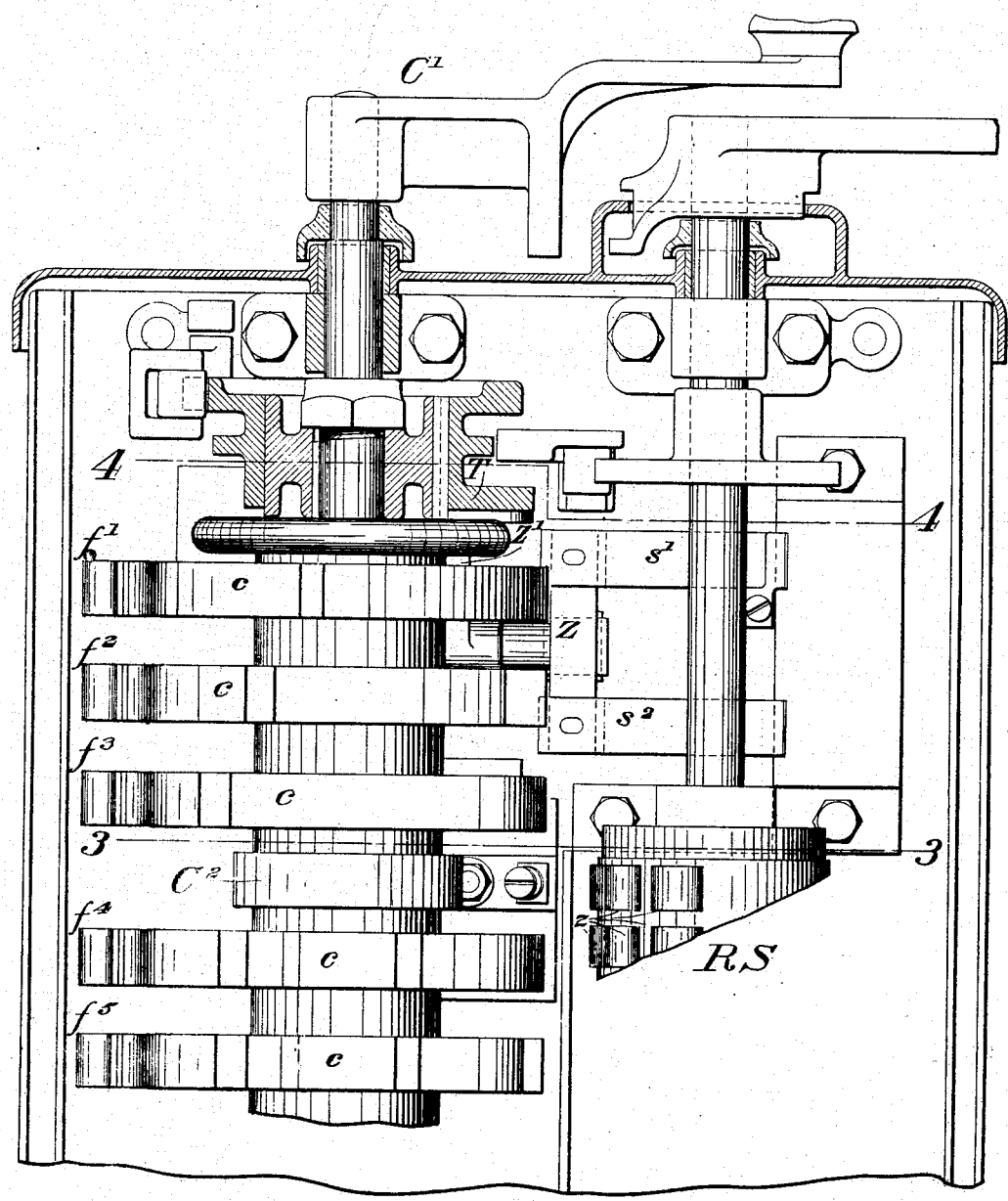
Figure 3:
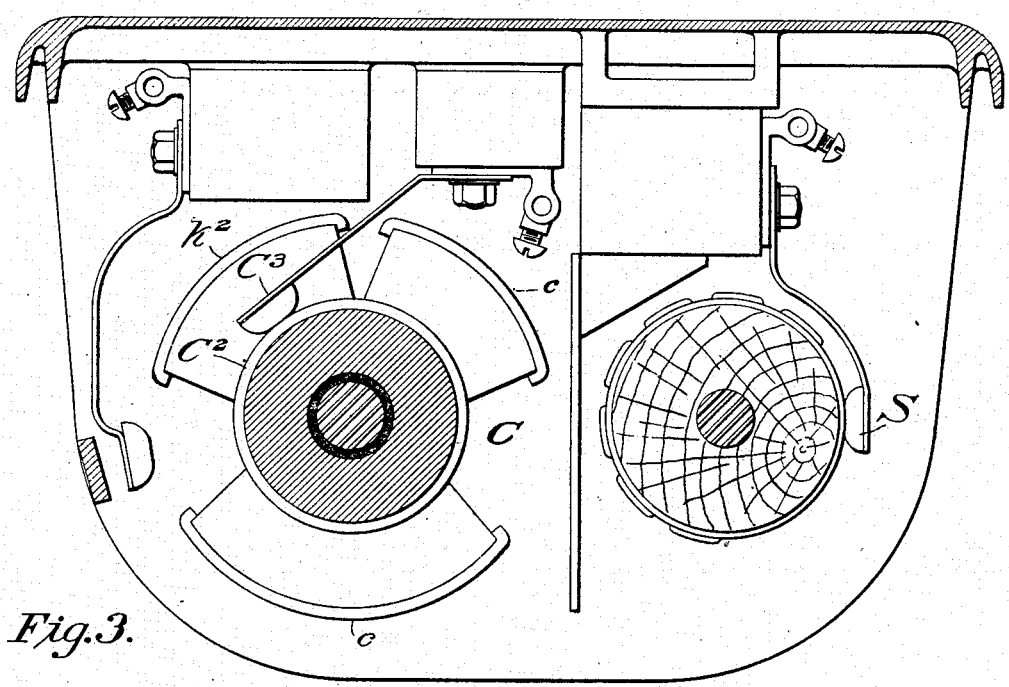
Figure 4:
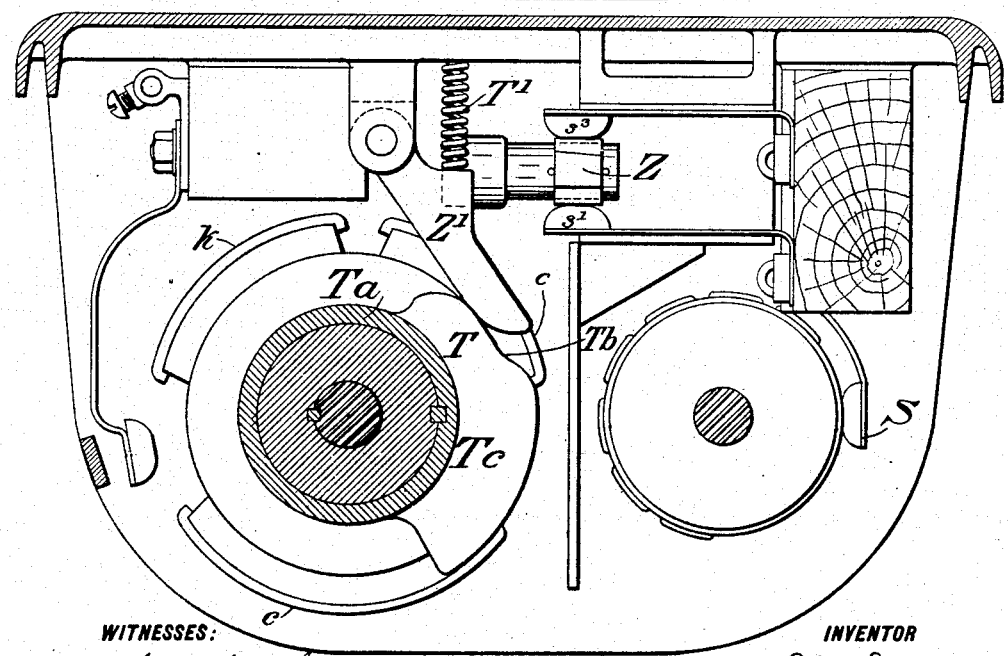
Figure 5:
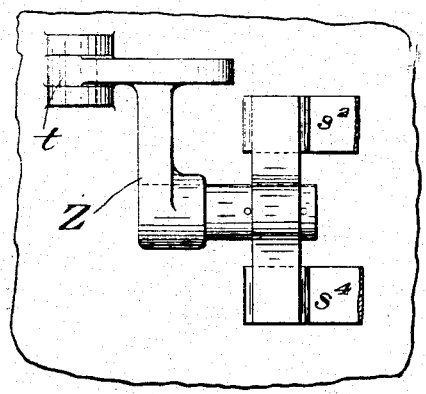
Figure 6:
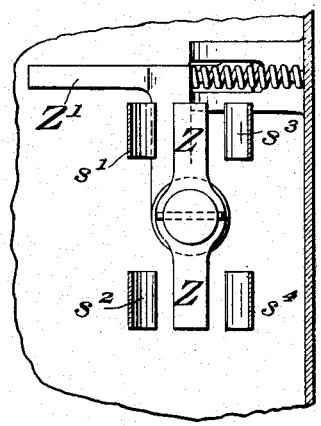
Figure 7:
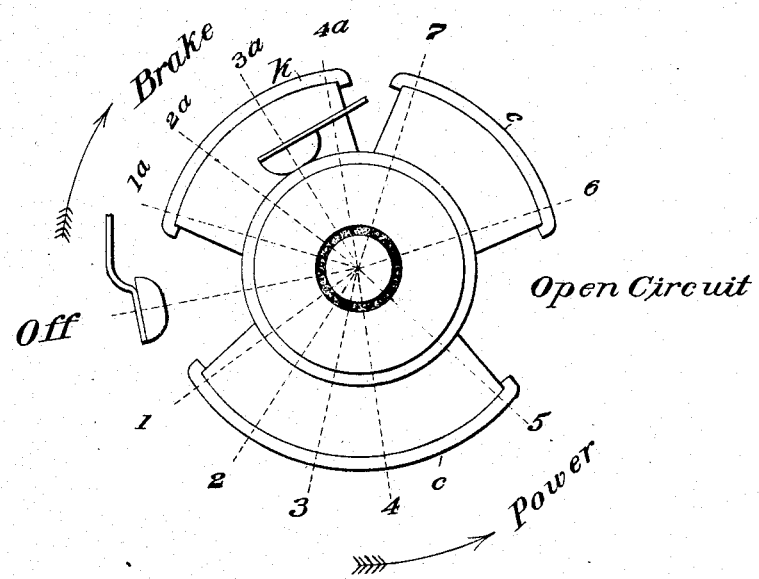
Figure 8:
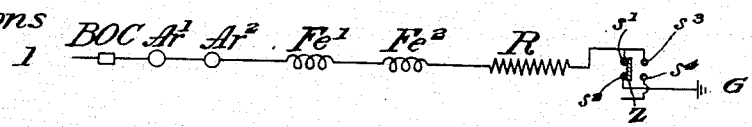
Figure 8:
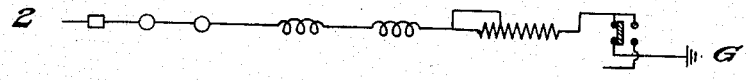
Figure 8:
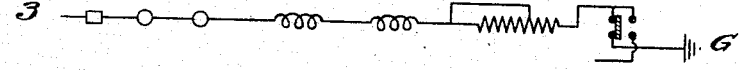
Figure 8:
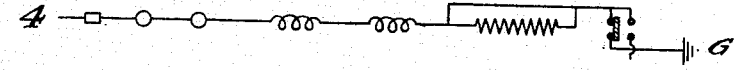
Figure 8:
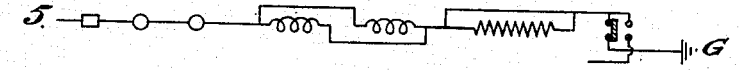
Figure 8:
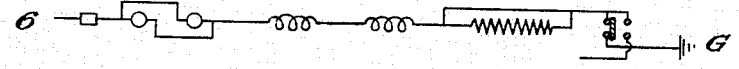
Figure 8:
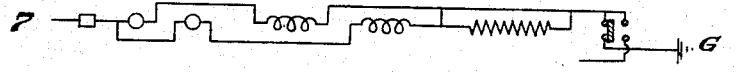
Figure 8:
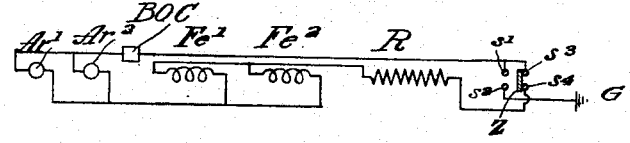
Figure 8:
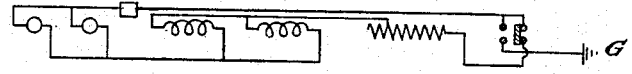
Figure 8:
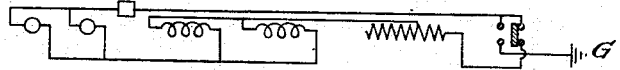
Figure 8:
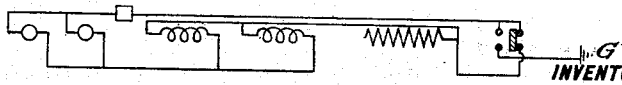

Figure 1 is a diagram or development in plane of switches and connections embodying my invention; Fig. 2, a view, partly in vertical section and partly in side elevation, of a portion of my improved power and brake controller; Fig. 3, a section on the line 3 3 of Fig. 2; Fig. 4, a section on the line 4 4 of Fig. 2; Figs. 5 and 6 are detail views of the auxiliary switch. Fig. 7 is a diagram illustrating the several positions of the main-switch drum, and Fig. 8 is a view showing graphically the circuit conditions which result from the different positions of the said drum.

The letter C designates the rotary drum of the combined regulator and brake switch, operated by a handle C'. This drum is of well-known mechanical type and is provided with a plurality of contacts $c$, which coöperate with the fixed contact-fingers $f'$ $f^2$, &c. The contacts $c$ may be arranged to effect any desired system of control. The particular arrangement shown is designed to effect the method of control described and claimed in the patent to F. A. Merrick, No. 645,116, dated March 13, 1900, in which the motors are changed from series to parallel relation by intermediate steps, wherein the fields are first connected in parallel and the armature in series and then the armatures are connected in parallel and the fields in series. The seven running power positions of the drum are indicated by the vertical lines numbered from 1 to 7, inclusive, in the diagram Fig. 1. In this diagram the two motors are indicated, respectively, as No. 1 and No. 2, and their field and armature coils are further respectively designated as $Fe'$ $Fe^2$ $Ar'$ $Ar^2$. RS indicates the reversing and cut-out switch, having a plurality of contacts $z$ and contact-fingers S S' $S^2$, &c. This switch is preferably of the well-known type employed in the "No. 38" controller manufactured by the Lorain Steel Company and need not be further described.

BOC indicates a blow-out coil, and R artificial resistance for connection in series with the motors at starting and also to regulate their action when running as generators in a local circuit.

$Tx$ indicates the trolley connection; FB, a fuse-box; $La$, a lightning-arrester, and CC a choke-coil.

In so far as above described the general arrangement and operation is similar to that of the No. 38 controller above referred to. The drum C, however, is designed to have a rotary movement in the other direction from its off position from that which it has in the normal control of the motors, and there is accordingly provided on the other side of the drum a plurality of additional contacts $k$ $k'$, &c., for engagement with the contact-fingers $f'$ $f^2$, &c., in the four braking positions indicated by the vertical lines $1^a$ $2^a$ $3^a$ $4^a$.

$s'$ $s^2$ $s^3$ $s^4$ designate the four fixed contacts of an auxiliary switch, and Z a movable contact member of the same. This movable member is carried on an arm $Z'$, which is pivoted to the controller-frame at $t$ and is arranged to bear on a cam T on the shaft of the drum C. This cam has a low portion T$a$, a high portion T$c$, and an intermediate portion T$b$. $T'$ is a spring for holding the arm $Z'$ in engagement with the said cam. The construction and arrangement of this auxiliary switch are clearly shown in Figs. 4, 5, and 6. When the drum C is at its off position, the free end of the arm $Z'$ is resting on the intermediate portion T$b$ of the cam T, and the movable contact member Z is held midway between the two pairs of contacts $s'$, $s^2$, $s^3$, and $s^4$, as shown in Figs. 4 and 6. When said drum is turned to any one of its brake positions, the high portion T$c$ of the cam actuates the arm $Z'$ to move the member Z into bridging engagement with the contacts $s^3$ $s^4$; but when the drum is turned to any one of its power positions the arm Z follows the low portion T$a$ of the cam and the member Z is moved to connect the two contacts $s'$ $s^2$. Contacts $s'$ and $s^3$ are permanently electrically connected together, and contact $s^3$ is connected to the last section of the resistance R and also to the first contact-finger $f'$. Contact $s^4$ is permanently connected to the blow-out coil and also to the contact-finger $f^{12}$. Contact $s^2$ is permanently connected to ground. The drum C is also provided with a special contact $C^2$, whose corresponding contact-finger $C^3$ is permanently connected to the first section of the resistance R.

The circuits can be readily traced from the diagram. In the first power position the current after passing through the two motors in series returns to the finger $f^4$, thence to the contact $c^2$, thence to finger $C^3$, thence to and through all the resistance R, thence to contacts $s^3$, $s'$, Z, and $s^2$ of the auxiliary switch, and to ground. In the second position one section of the resistance is short-circuited by the engagement of the finger $f^3$ with the corresponding contact $c$. In the third position the engagement of the finger $f^2$ with the corresponding contact short-circuits a second section is short-circuited at position 4 by the section of the resistance, and the remaining contact engagement of finger $f'$. At position 5 the fields are placed in parallel, as shown in Fig. 8, with the armatures in series, and at position 6 the armatures are connected in multiple and the fields in series. At position 7 the two motors are connected in full multiple. Throughout positions 5, 6, and 7 the resistance remains short-circuited, as will be readily seen. To apply the electric brake, the handle $C'$ is turned by off position and successively through positions $1^a$, $2^a$, $3^a$, and $4^a$. In passing to position $1^a$ the switch member Z is automatically shifted from the contacts $s'$ $s^2$ to the contacts $s^3$ $s^4$, the trolley connection is broken, and the motors are connected in a closed circuit, in which the fields and armatures of the two motors are connected in parallel and all the resistance R is included in circuit. The current generated by the motors now passes from the positive brushes through the reversing-switch to the blow-out coil, thence to and through the auxiliary switch, to and through the resistance R, to contact $C^2$. Contact $C^2$ is electrically connected with the contacts $k^4$ and $k^6$, and the circuit divides between these contacts, one path being from contact $k^4$ to finger $f^6$, through the reversing-switch to field F$e^2$, returning to finger $f^4$, to contacts $k^2$ $k^3$. The other path is from contact $k^6$ to finger $f^8$, through the reversing-switch to field F$e'$, returning to finger $f^5$, to contacts $k^2$ $k^3$. The contacts $k^2$ $k^3$ are electrically connected together and also to the contacts $k^5$ $k^7$, and the current returns to the negative side of the armature A$r^2$ by way of contact $k^5$ and finger $f^7$ and to the negative side of armature A$r'$ by contact $k^7$ and finger $f^9$. At position $2^a$ the only change is that finger $f^3$ engages the contact $k'$, and thus short-circuits one section of the resistance R. At position $3^a$ the engagement of the finger $f^2$ with the contact $k$ short-circuits a second section of resistance, and at position $4^a$ the engagement of finger $f'$ with one of the extended contacts $c$ short-circuits the entire resistance.

It will be seen from the foregoing that the entire operation of controlling and braking the motors is effected by the operation of the one handle $C'$, the reverse-switch being operated only to reverse the direction of movement of the car or to cut out one of the motors when disabled. It will also be noted that the addition to the drum C of the braking positions requires but few extra contacts and additional connections and that no additional fingers are required.

I do not wish to be limited to the details of construction, combination, and arrangement which I have herein shown and described, as these may be varied without departing from the spirit and scope of my invention as it is set forth in the following claims.

Having thus described my invention, what I claim, and desire to secure by Letters Patent, is—

1. In a combined power and brake controller for electric motors of the series type, a unitary movable switch member having on one portion of its surface a plurality of contacts arranged to shift the motors from series to parallel relation, and upon another portion of its surface other contacts arranged to entirely open the trolley-circuit and to connect the motors with their fields and armatures in reversed relations in a closed circuit to run as generators, said switch member having intermediate the two sets or groups of contacts an open-circuit position, together with stationary fingers common to both sets or groups of contacts.

2. In a combined power and brake controller for electric motors of the series type, a switch having one set of movable contacts for regulating the power and speed of the motors, and another set of movable contacts arranged to entirely open the trolley-circuit and to connect said motors in a closed circuit to run as generators, both of said sets of contacts being carried by a single member, and between said sets of contacts an open-circuit position, together with stationary coöperating contact-fingers common to both sets of movable contacts.

3. In a combined power and brake controller for electric motors, the combination with the motors, and artificial resistance for connection in circuit therewith, of a rotary switch member having one set of contacts which in different positions of said member will connect the motors in series with said resistance, then remove the same from circuit, and then change the motors to parallel relation, and another set of contacts which in still other positions of said member entirely open the trolley-circuit and connect the motors in a closed local circuit, with and without resistance, to run as generators.

4. In a combined power and brake controller, the combination with two electric motors, and resistance for connection in circuit therewith, of a rotary switch member having one set of contacts for connecting said motors in series with and without said resistance, and also in parallel, and also with either the armatures or the fields connected in parallel, and the remaining elements connected in series with each other and with the parallel connected elements, and another set of contacts for connecting the motors in a closed circuit, both with and without resistance, to run as generators.

5. In a controller of the character described, a movable contact-carrying member having contacts upon one side for regulating the power and speed of the motors, and on its other side, other contacts arranged to entirely open the trolley-circuit and to connect the motors in a closed circuit with their armatures reversed, and to include in such closed circuit more or less of external resistance.

6. In a controller of the character described, the combination with a controlling-drum having one set of positions for controlling the power and speed of the motors, and other positions for connecting them to run as generators and for controlling their action as such, of an auxiliary switch which in the first-named positions of the drum affords a ground connection for the motors, and in its other positions connects artificial resistance in circuit with the motors, together with means for automatically throwing said auxiliary switch as the drum is moved from one set of positions to the other.

7. In a controller of the character described, the combination of a rotary drum having contacts for regulating the power and speed of the motors, and also for connecting them to run as generators, and for regulating their action as such, of an auxiliary switch having one position in which it completes a ground connection for the motors, and a second position at which it connects external resistance in circuit with the motors running as generators, and a cam moving with said drum and arranged to shift the movable member of said switch at predetermined times.

8. The combination with electric motors, and artificial resistance for connection in circuit with said motors, of a controller-drum having a continuous contact to which one end of the resistance is connected, a ground connection for the opposite end of the resistance and other contacts arranged to be connected at predetermined times with different sections of said resistance to short-circuit portions thereof, and means for breaking the ground connection of the resistance and connecting the normally-grounded end to said drum when the latter is in certain predetermined positions.

9. A combined power and brake controller for electric motors, having one drum provided with contacts for regulating the power and speed of the motors, and also for connecting them in a closed circuit to run as generators, and for regulating their action as such, and a second switch having contacts and connections for reversing the motors and also for removing either motor from circuit.

In testimony whereof I have affixed my signature in presence of two witnesses.

EMMETT W. STULL.

Witnesses:
BLANCHE M. SMITH,
H. W. SMITH.